United States Patent [19]
Edberg et al.

[11] Patent Number: 5,844,815
[45] Date of Patent: Dec. 1, 1998

[54] UMBILICAL AND FOLLOWER ASSEMBLY UTILIZED IN MICROGRAVITY PLATFORM SYSTEM

[75] Inventors: Donald L. Edberg, Irvine; David J. Schenck, Los Alamitos, both of Calif.

[73] Assignee: McDonnell Douglas Corporation, St. Louis, Mo.

[21] Appl. No.: 800,064

[22] Filed: Feb. 14, 1997

Related U.S. Application Data

[60] Provisional application No. 60/028,240 Oct. 8, 1996.
[51] Int. Cl.$^6$ .................................................. G05B 15/00
[52] U.S. Cl. ...................... 364/559; 364/167.02; 248/638
[58] Field of Search ................................... 364/559, 135, 364/167.07, 167.02; 248/638, 179.1, 187.1, 619, 329; 250/251, 206.1, 559.31; 74/471 XY, 479.01

[56] References Cited

U.S. PATENT DOCUMENTS

| | | | |
|---|---|---|---|
| 5,059,789 | 10/1991 | Salcudean | 250/206.1 |
| 5,206,504 | 4/1993 | Sridharan | 250/251 |
| 5,231,336 | 7/1993 | Van Namen | 318/128 |
| 5,271,290 | 12/1993 | Fischer | 74/471 XY |
| 5,310,157 | 5/1994 | Platus | 248/619 |
| 5,368,271 | 11/1994 | Kiunke et al. | 248/638 |
| 5,379,657 | 1/1995 | Hasselman et al. | 248/648 |
| 5,419,528 | 5/1995 | Carter et al. | 248/638 |
| 5,638,303 | 6/1997 | Edberg et al. | 364/559 |

OTHER PUBLICATIONS

D.I. Jones, "Strategies For Controlling a Microgravity Isolation Mount", May 23, 1990, Proceedings of the 1990 American Control Conference.

Primary Examiner—James P. Trammell
Assistant Examiner—Bryan Bui
Attorney, Agent, or Firm—Robert Westerlund

[57] ABSTRACT

An umbilical and follower assembly for preventing unwanted movements of a frame from being transmitted by an umbilical cord to a microgravity platform as may be utilized on an orbiting space vehicle. The follower assembly includes a plurality of actuators capable of moving an umbilical attachment in directions which are opposite to the unwanted movements of the frame. The attachment engages a portion of the umbilical and thus maintains the umbilical in a predetermined position relative to the platform, preventing the unwanted frame movements from being transmitted past the attachment and to the platform. The umbilical preferably includes a portion having three separate loop portions, with each loop extending in a different orthogonal plane and capable of absorbing rotational motion in that plane by deformation of the loop portion.

19 Claims, 6 Drawing Sheets

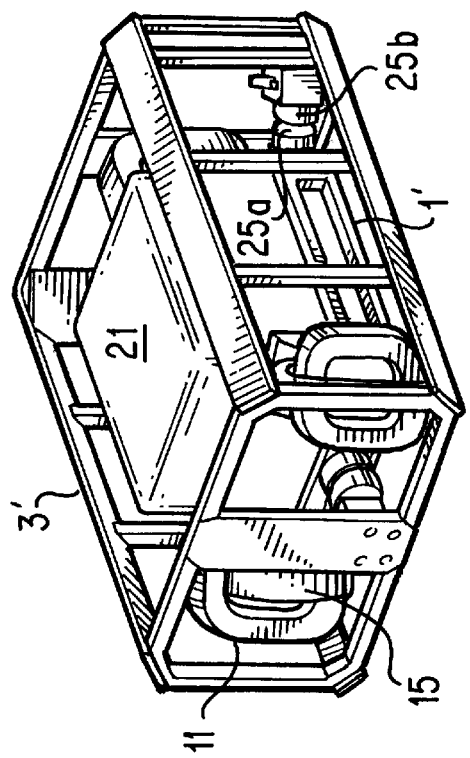
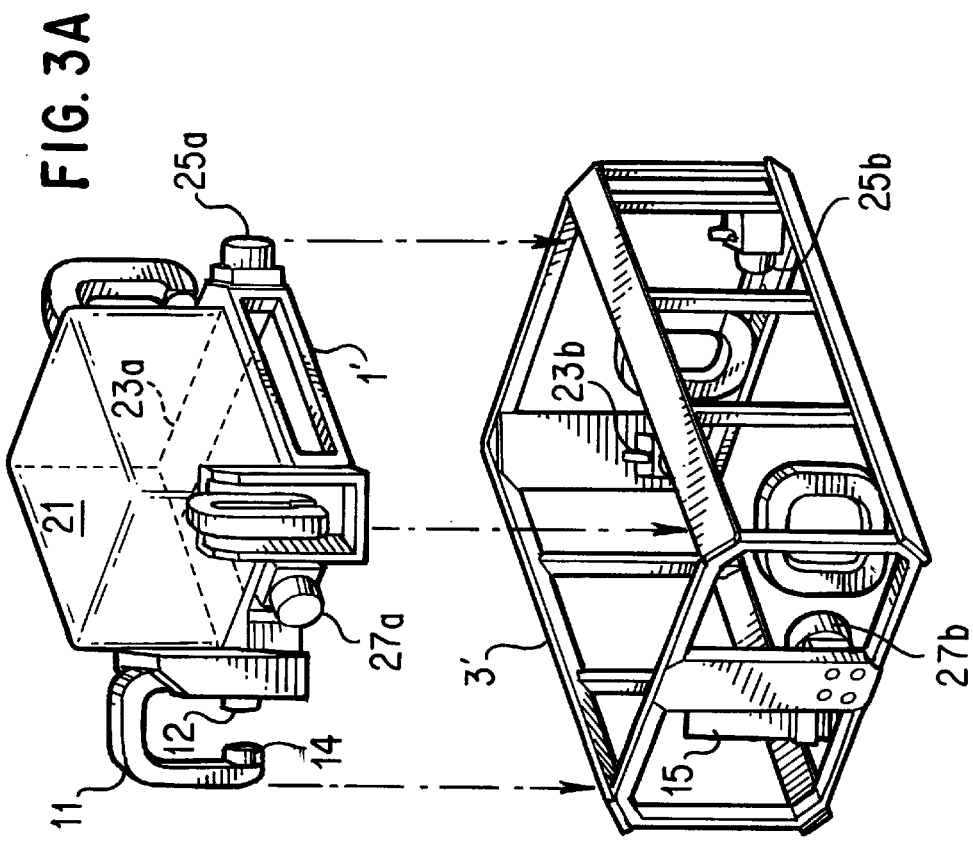

UMBILICAL AND FOLLOWER ASSEMBLY UTILIZED IN MICROGRAVITY PLATFORM SYSTEM

CROSS-REFERENCE TO RELATED APPLICATION

This application is based on provisional application Ser. No. 60/028,240, filed on Oct. 8, 1996, which thus constitutes the effective filing date of the present application, for all subject matter disclosed in the provisional application.

BACKGROUND OF THE INVENTION

The present invention generally relates to an active vibration isolation system for isolating a microgravity sensitive platform and payload from external forces that may occur in an orbiting space vehicle in which the payload and isolated platform are positioned. More particularly, the present invention relates to a unique umbilical and follower assembly which improves operation of the vibration isolation system by significantly reducing, if not completely preventing, disturbances generated by motion of the space vehicle from being transmitted through the umbilical cord to the isolated platform and payload.

The present invention can be utilized with a vibration isolation system of the type disclosed in U.S. patent application Ser. No. 08/496192, filed Jun. 28, 1995, entitled NON-CONTACTING ISOLATED STABILIZED MICOGRAVITY PLATFORM SYSTEM, assigned to the assignee of the present invention (hereinafter referred to as "copending application") and incorporated into the present application by specific reference thereto. It is to be understood that the present invention is not intended to be limited in any way to use with the vibration isolation system disclosed in the copending application and can be utilized with any vibration isolation system with which it is compatible.

The need to carry on certain types of experiments and manufacture in a microgravity environment is known. As discussed in the copending application, crystal growth modules, biological experimental apparatus, combustion and mixing facilities, and materials science investigations, including but not limited to semiconductors, glass amorphous solids, high temperature alloys, ceramics, fluid and combustion physics: biotechnology, including protein crystal growth, separation of biological products, and controlled microgravity experiments, should all benefit in a microgravity environment.

A serious problem resides in maintaining the microgravity environment in the face of transient force effects inherently produced during operation of a space vehicle. Astronauts moving about the space vehicle may bump into or push themselves off the vehicle's walls. Likewise, electric motors from time to time are actuated as when adjusting a space vehicle's solar array panels. Interaction with the space vehicle's walls or the operation of electric motors will create vibrational forces and/or torque that act on the space vehicle. In accordance with Newtonian physics, these forces create motions in the space vehicle that may momentarily accelerate the microgravity payload, thereby producing an acceleration effect. While these acceleration forces are minute relative to gravity on earth, they are significant enough relative to microgravity levels to jeopardize the results obtained from the on-board experiments or manufacture. The copending application teaches a non-contacting, active isolation system and stabilized platform which effectively counteracts these disturbing forces, thus maintaining the required, stable microgravity environment for the isolated platform and payload.

In order to transfer coolant, vacuum, power, data and the like, one or more umbilical cords usually extend from a support base to the isolated platform or directly to the payload. When transmitting coolant fluids or drawing a vacuum, the umbilical cord needs to have a certain amount of strength and stiffness. When such umbilical cords are of non-zero stiffness, they will have a certain degree of elasticity. Motion of the space vehicle may act on the base or frame of the microgravity system, causing the umbilical cord to be pushed, pulled and/or twisted. Because the umbilical is attached to the isolated platform or the payload, movement of the umbilical cord can result in unwanted motion of the isolated platform and ultimate loss or instability of the microgravity environment.

In a paper entitled STRATEGIES FOR CONTROLLING A MICROGRAVITY ISOLATION MOUNT by D. I. Jones and presented May 23, 1990 at the Proceedings of the 1990 AMERICAN CONTROL CONFERENCE, there is a discussion of the effect of an umbilical cord on the position of a microgravity platform. This discussion includes a proposed one degree of freedom (1-DOF) solution to preventing the umbilical cord from causing motion of the platform along a single axis. The paper states that a tri-axis version of the "controlled umbilical strategy" would require a substantial amount of additional hardware and ". . . because the servo loop is in continuous motion, component lifetime may be limited in a practical implementation." See page 2606. For reasons that will become clear, the present invention constitutes a novel, multi-axis solution to the problem of absorbing unwanted umbilical forces acting in any direction from being passed by the umbilical cord to the payload.

The unique umbilical and follower assembly of the present invention absorbs unwanted linear and torsional forces produced by the umbilical cord and thereby prevents such forces from affecting the microgravity environment of the payload. In addition, the follower assembly is designed to easily provide steady, large or small bias forces on the umbilical cord to compensate for mechanical preload or umbilical bias forces, thereby minimizing the power consumption of the payload isolation system.

Based on the above and foregoing, it can be appreciated that there presently exists a need in the art for a technique to prevent an umbilical cord from being deformed and transmitting the deformation forces to a microgravity payload while, at the same time, assuring that the umbilical cord has sufficient capacity to transfer necessary services, such as vacuum and cooling fluids, to and from the isolated platform. The successful solution must not add unnecessary weight or cost to the payload vibration isolation system as a whole and yet be able to prevent multi-directional forces and moments from bending, extending, compressing and/or twisting the umbilical cord assembly in any direction. The present invention fulfills this need in the art.

SUMMARY OF THE INVENTION

The present invention comprises an umbilical and follower assembly having multi-directional capability which is preferably mounted on a microgravity base or frame of the type described in applicants' copending application. The follower assembly may be located between the frame and a microgravity isolation platform floating in a stabilized position above the base, or the follower could be positioned to the side of the base and the isolation platform. Regardless of its location, a portion of the follower assembly is capable of movement relative to the base as needed to remain in a predetermined position relative to the isolated platform and payload mounted on the platform.

In particular, the follower assembly includes a multi-directional actuator assembly attached to the base or base extension. In the three degree of freedom "3-DOF" embodiment, a combination of three separate linear actuators are arranged as a single actuator assembly mounted on the base or frame. Attached to an arm of the actuator assembly is an umbilical mount. The mount may take the form of a clamp, a hollow sleeve with fittings on both sides or any conventional connector. Each linear actuator is capable of moving the arm and attached umbilical mount in a respective one of the three orthogonal directions x, y or z. Preferably, each actuator consists of a small gear motor and lead screw capable of providing direct linear motion along one of the orthogonal axes, or each actuator may comprise a rotary servomechanism having an arm capable of converting rotation to linear movement of the umbilical mount. Alternatively, any conventional actuator assembly capable of providing three directional, freedom of movement ("3-DOF") of the umbilical mount may be employed.

In one embodiment, a single umbilical cord has one end connected to the base or frame and an opposite end attached to a connector which, in turn, is connected to the floating platform and payload mounted on the platform. The single umbilical cord includes a first portion of average or conventional stiffness (hereinafter "normal portion") extending from the base to the umbilical mount and a second portion of significantly reduced stiffness (hereinafter "tailored portion") extending from the umbilical mount to the isolated payload. The tailored portion of the umbilical cord has a stiffness which may be one or more orders of magnitude less than the stiffness of the normal portion. This arrangement assures that the amount of force transmitted to the floating platform is minimized for any particular use. The tailored portion of the umbilical includes three loop portions connected at one end to the normal portion of the umbilical assembly and at the opposite end directly or indirectly to the payload. Each of the loop portions extends within a respective one of the three orthogonal planes in order to separate and dampen through bending multi-directional deflections and control torsional forces seeking to rotate the umbilical along one or more of the orthogonal axes, since bending stiffness is far less than torsional stiffness.

During operation, position sensors mounted on the frame detect movement of the frame relative to the isolated platform and payload. As described in applicants' copending patent application, a control system receives and processes signals received from the position sensors and determines how to move the umbilical mount to directly oppose and thereby prevent unwanted motion of the base from being transmitted by the umbilical to the payload. This guidance information is utilized to generate control signals which are supplied to the multi-directional actuator assembly, causing the various actuators to engage and move the umbilical mount in one or more orthogonal directions necessary to maintain the mount in its predetermined position relative to the isolated platform. Because the umbilical cord is fixedly attached to the umbilical mount, linear movement of the mount causes similar linear movement of the normal portion of the umbilical cord, but no or little movement of the tailored portion of the umbilical cord, thereby negating the effect of the forces acting on the umbilical cord. This means that no, or very little, net linear force is transmitted from the umbilical cord to the isolated platform. The position and orientation of the mount remain the same relative to the isolated platform even as the base on which the follower is mounted is subjected to unwanted motions.

Because a conventional umbilical cord assembly is made up of one or more hoses that comprise spiral or helical-wound metal shielding or reinforcing fibers, it exhibits substantial torsional stiffness which results in torsional forces being transmitted by the umbilical cord. Unless the torsional forces are properly absorbed, they will act to move the isolated platform and payload, seriously compromising the microgravity environment. To overcome this problem, the unique umbilical cord of the present invention includes a tailored portion formed with three separate loop portions, with each loop extending in a different one of three orthogonal planes to minimize the unwanted torsional forces in each of the planes. This is achieved because the axial and torsional deformation that would normally occur in each orthogonal plane is relieved by bending of the particular tailored loop portion extending within the respective plane. As a result, the follower assembly negates linear motion in the three orthogonal directions while the umbilical loop portions negate torsional forces from causing the umbilical to transmit rotational motion to the isolated platform.

BRIEF DESCRIPTION OF THE DRAWINGS

These and various other features and advantages of the present invention will be readily understood with reference to the following detailed description read in conjunction with the attached drawings, in which:

FIGS. 3A, 3B and 3C are partial perspective views of the mechanical aspects of an isolation platform and base used in the vibration isolation system disclosed in the copending application;

DETAILED DESCRIPTION OF THE INVENTION

The present invention provides a unique follower and umbilical assembly for preventing displacements of the base from moving an attached umbilical cord and thereby disturbing a microgravity payload attached directly or indirectly to an end of the umbilical cord. For purposes of explanation only, the present invention will be discussed in conjunction with the vibration isolation system described in detail in applicants' copending application. A brief description of the vibration isolation system disclosed in applicants' copending application is provided hereafter to facilitate a better understanding of how the present invention functions to prevent unwanted motions of the space vehicle from being transmitted by the umbilical to the floating payload.

Figure 1:
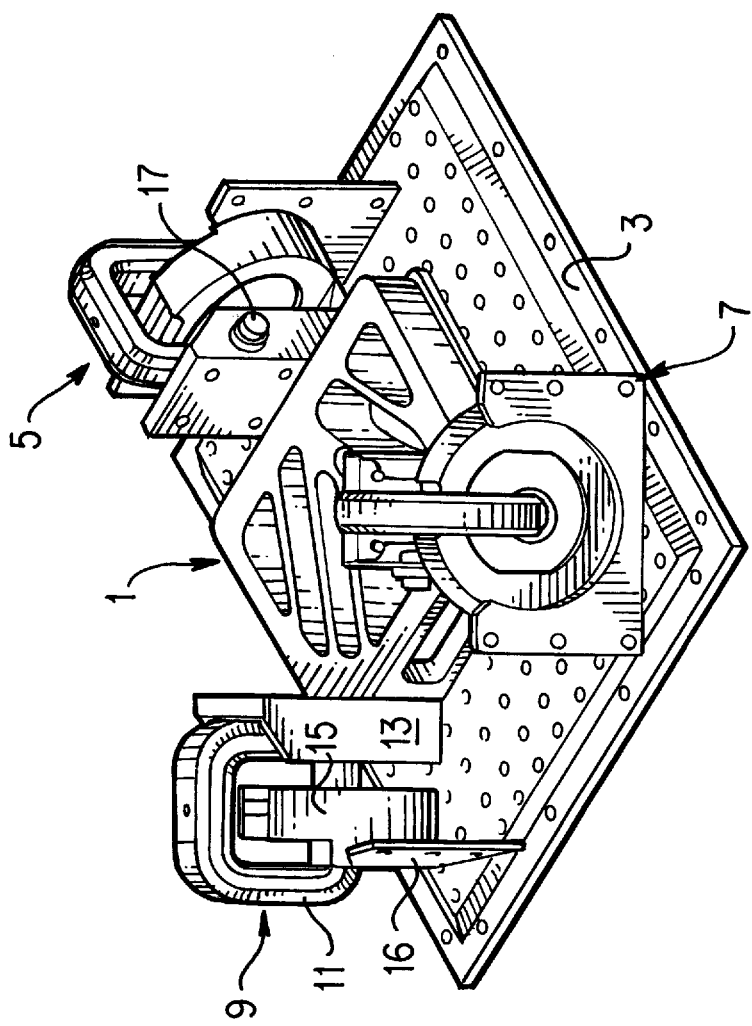
FIG. 1 is a partial perspective view of an embodiment of the isolated platform as described in applicants' copending application.

FIG. 1 depicts a partial perspective illustration of the isolation system described in applicants' copending application. In particular, a platform 1 is positioned to essentially float in a predetermined position above a base or frame 3 which is, itself, affixed to and held in a rigid position on the space vehicle, not illustrated, by brackets or other devices, also not illustrated. Three wide gap magnetic actuators 5, 7 and 9 are utilized to maintain floating platform 1 in a predetermined position relative to frame 3. The actuators utilize magnetic fields, preventing any direct physical contact between frame 3 and floating platform 1.

Figure 2:
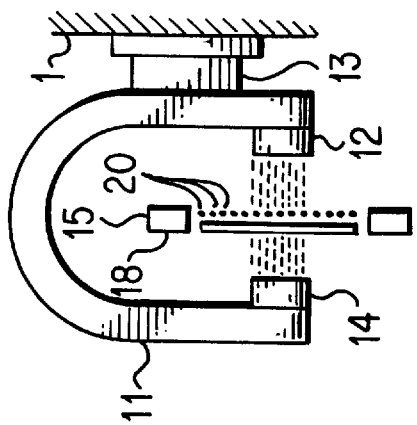
FIG. 2 schematically illustrates a portion of one of the magnetic actuators employed in the vibration isolation system disclosed in the copending application.

The actuator 9, shown schematically in FIG. 2, contains two physically separate parts, a pole piece connected to the floating platform 1 and an armature connected to the base 3. The pole piece 11 is essentially U-shaped and formed of ferromagnetic material that contains a permanent magnet at each of the pole tips 12 and 14, respectively. Pole piece 11 is rigidly attached to floating platform 1 by means of a conventional bracket 13. Armature or paddle 15, is suitably formed of electrical coils of wire that is potted within an electrically non-conductive epoxy material. Armature 15 fits within the wide gap formed between the stems of the pole piece 11. A portion of the coil is located in the lines of flux created by magnets 12 and 14 and another portion of the coil is located outside the lines of flux. Armature 15 is supported by and affixed to frame 3 by any conventional means, such as by the bracket 16 shown in FIG. 1.

During operation of the magnetic actuators 5, 7 and 9, electrical current in the armature's electrical coil creates a force on the coil assembly. The force moves the armature 15 into or away from the lines of flux created by magnets 12 and 14. Since the armature 15 is fixed to frame 3, the force causes the pole piece 11 to move in response. As a result, current from one of the armature coils creates a force in one direction, such as the horizontal direction, and relative movement in the horizontal direction. In a similar manner, current through the other coil creates a force in a different, orthogonal direction, such as the vertical direction, causing movement in the vertical direction. By careful placement of the magnetic actuators 5, 7 and 9 it is possible for platform 1 to exhibit six degrees of freedom, that is to translate platform 1 in any of three orthogonal directions and rotate platform 1 about any of three orthogonal axes through appropriate current applied to one or more of the three actuators.

Two accelerometers are connected to each pole piece mounting bracket 13, for a total of six accelerometers capable of measuring movement of bracket 13 and attached floating platform 1. By properly positioning the accelerometers, it is possible to provide acceleration information for six degrees of movement of platform 1, including displacements and rotations along each of a set of three orthogonal axes.

Three position sensors are attached to frame 3 to monitor the relative position or spacing between floating platform 1 and frame 3. These position sensors detect any relative linear movement, tilt or rotation of platform 1 relative to frame 3 and supply that information to the electronic control system.

In a configuration of the isolation system of applicants' copending application shown in FIG. 3A, a payload 21 is positioned on floating platform 1'. In FIG. 3B, the frame 3' appears in the form of a ribbed rectangular cage which contains actuator armatures, such as 15'. Floating platform 1' is inserted within the open end of frame 3' as shown in FIG. 3C, with the open end of each pole piece easily fitting over without physically contacting its associated armature. Floating platform 1' may be separate from the payload 21 or may be integrally formed with the payload. In the present invention, the term "platform" or "floating platform" refers not only to a base or panel but may refer to the payload itself.

Figure 4:
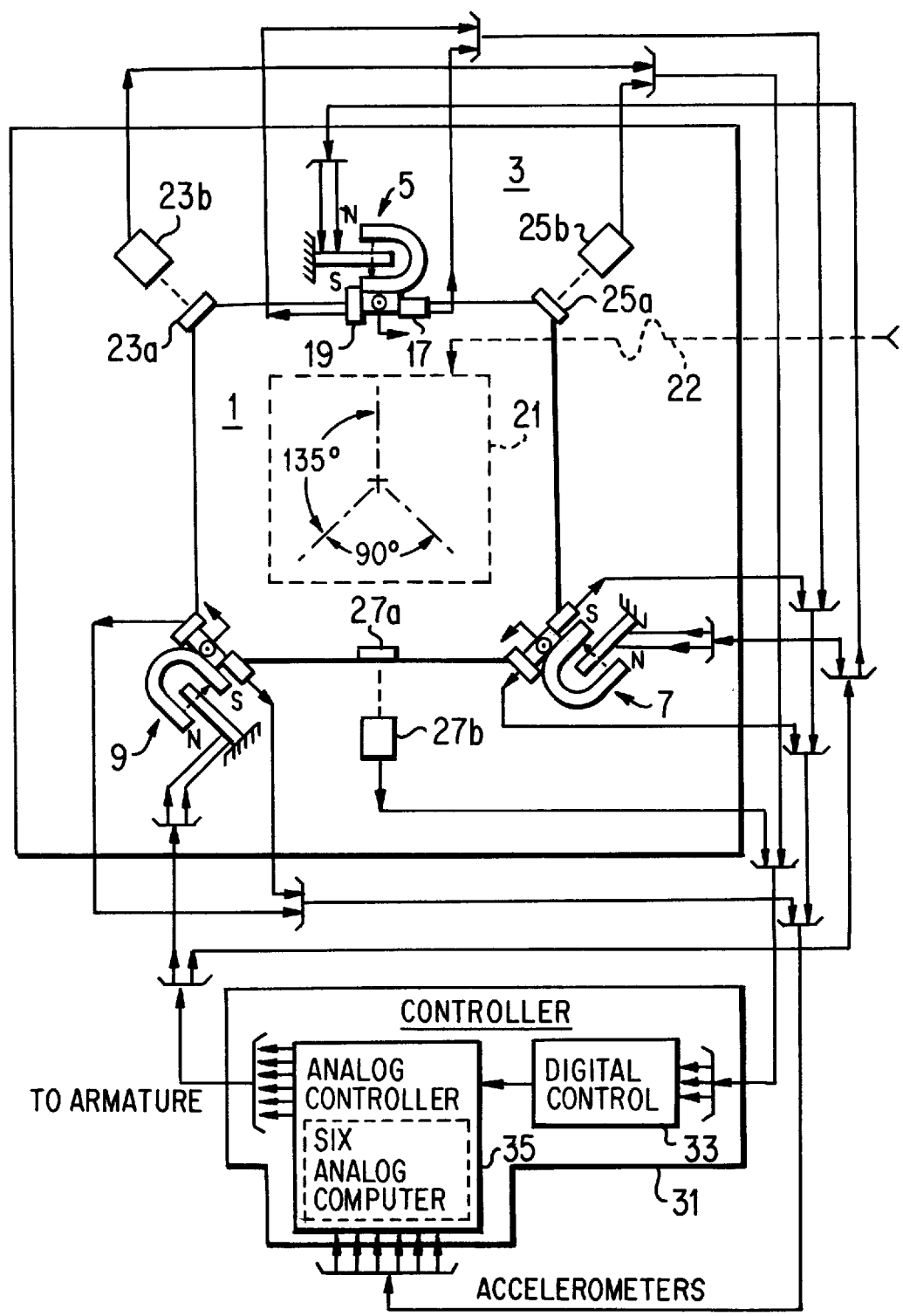
FIG. 4 illustrates in schematic and block diagram form the most recent version of the vibration isolation system disclosed in the copending application.

FIG. 4 illustrates the stabilization system of applicants' copending application including a conventional, soft umbilical 22 extending from frame 3 to floating platform 1. As will be discussed in connection with FIGS. 6 and 7 hereafter, the present invention has replaced a conventional umbilical 22 with a unique umbilical structure as well as introducing the unique follower assembly of the present invention. As a result, movements that could deform a conventional umbilical cord and ultimately disturb floating platform 1 are prevented from ever reaching platform 1.

Figure 5:
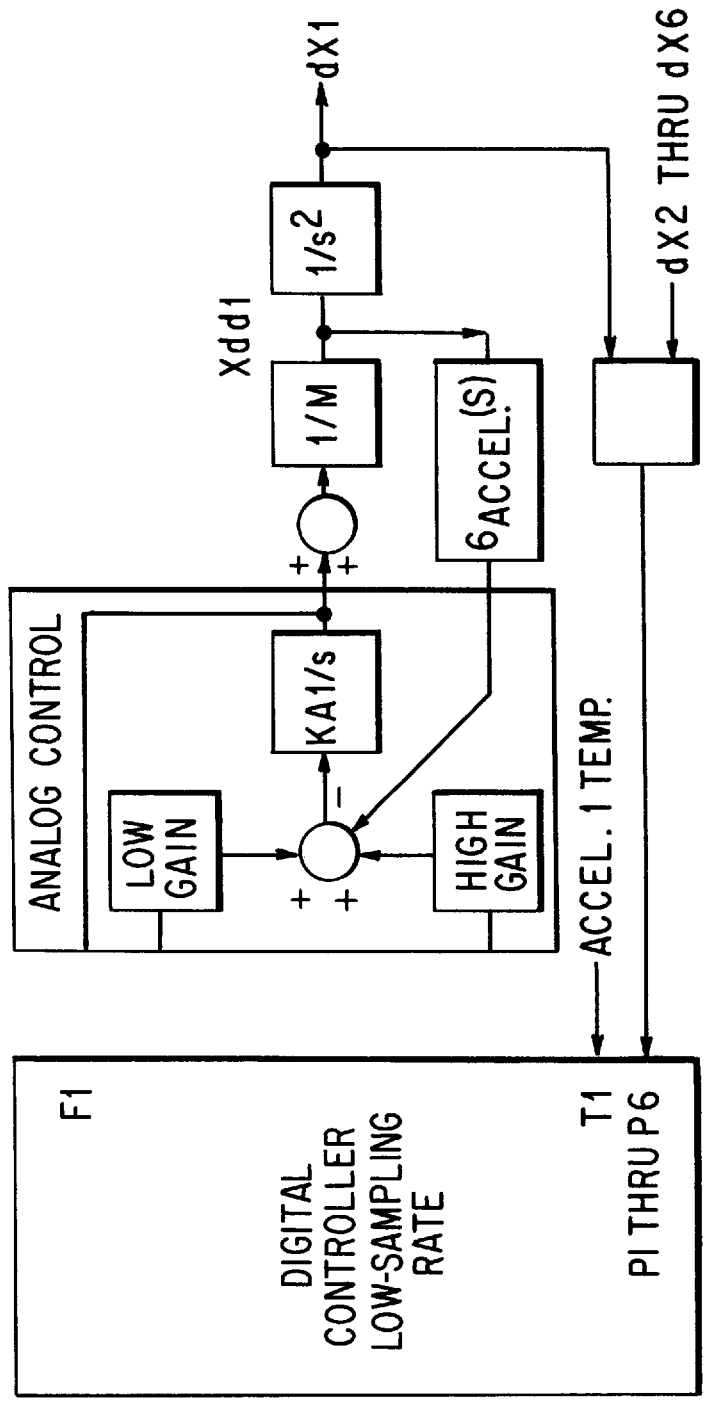
FIG. 5 is a functional block diagram of the control system utilized in applicants' copending application.

As described in applicant's copending application, information generated by the accelerometers and position sensors necessary to stabilize the position of the floating platform 1 and payload 21 is transmitted to a control system illustrated in FIG. 5 as a functional block diagram. The control system includes a high bandwidth decentralized analog inertial acceleration control loop, a low bandwidth digital position control loop, and a low bandwidth digital force management control loop. The structure and operation of the control system is set forth in detail in applicants' copending application and, for that reason, is not repeated herein. During operation, the control system determines if a force imbalance exists and, if so, internally recognizes a balance error. In response, the control system generates control signals causing the actuators counteract the disturbing forces and thereby maintain the floating platform in its proper stabilized position relative to the frame. In applicants' copending application any movement of the umbilical is counteracted by the same actuators 5, 7 and 9.

While the non-contact actuators 5, 7 and 9 utilized to stabilize the floating platform 1 could arguably also be employed to counteract disturbances acting on the umbilical, such a system would significantly increase system power consumption since the non-contacting actuators are not efficient in handling the relatively large forces causes by deformation of the umbilical cord. However, with the addition of the follower assembly and umbilical of the present invention, the non-contacting actuators are free to deal with very small space vehicle forces that cause motion of frame 3, while the follower assembly handles the larger bias and offset forces. The use of the follower assembly of the present invention also reduces the gap necessary on each of the actuators 5, 7 and 9, thereby improving efficiency of the microgravity isolation system as a whole.

Figure 6:
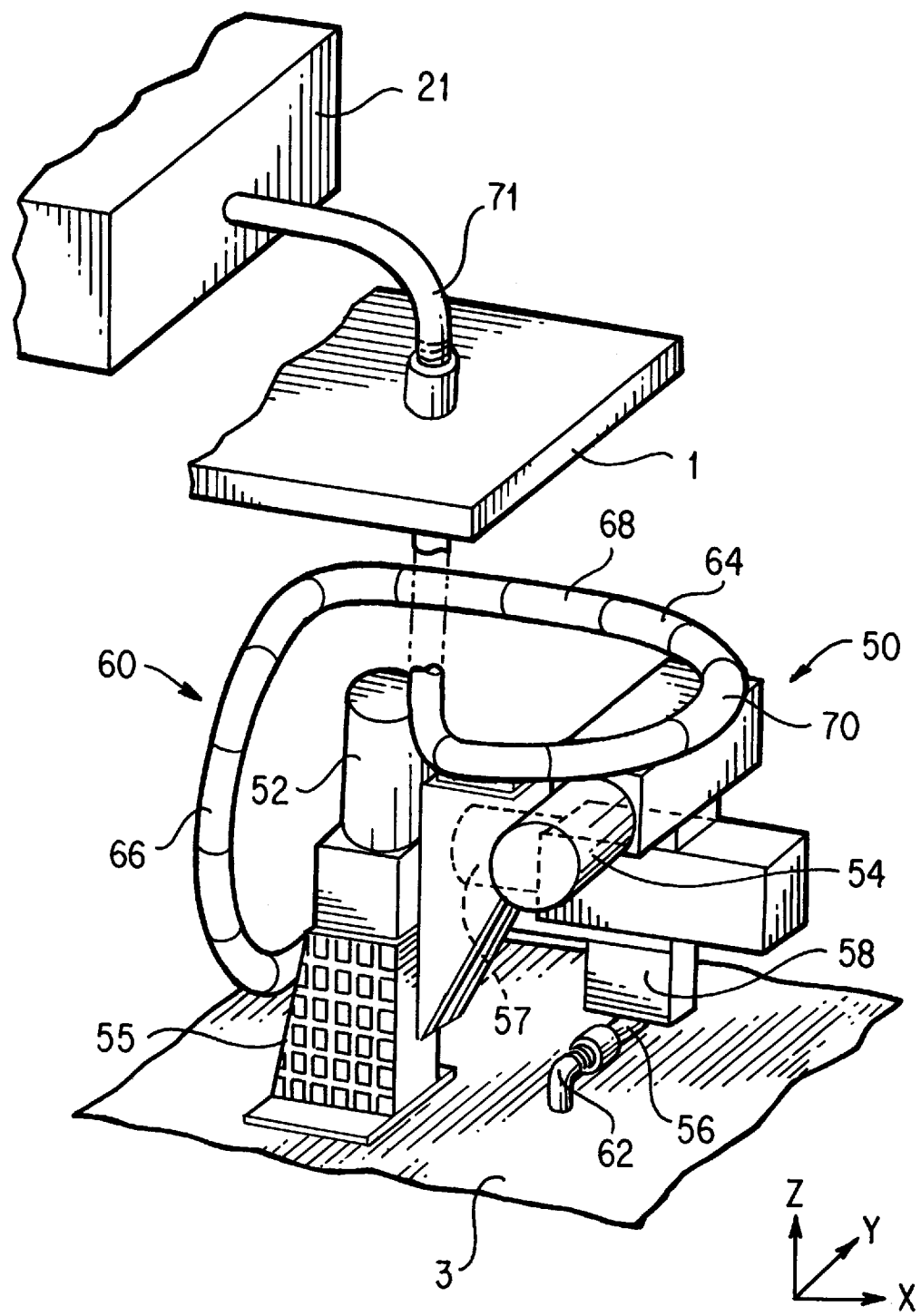
FIG. 6 is a perspective view of a three degree of freedom follower assembly and unique umbilical cord utilized in an embodiment of the present invention.

The follower assembly 50 of the present invention, as shown in FIG. 6, is preferably positioned between a floating platform 1 and frame or base 3 of the type described in the embodiment of FIG. 1. In order to facilitate positioning of follower assembly 50, it may be necessary to increase the spacing between floating platform 1 and frame 3 from that shown in FIG. 1. This can be achieved by inverting the floating platform from the configuration shown in FIG. 1. In addition to the follower assembly 50, FIG. 6 also illustrates a unique umbilical cord assembly 60 formed in accordance with the present invention. Preferably, umbilical cord assembly 60 is made up of at least two portions, a conventionally stiff or "normal" portion 62 and a less stiff or "tailored" portion 64. Umbilical cord assembly 60 can be formed as a single umbilical cord member having two portions 62 and 64 of varying stiffness, or umbilical cord assembly 60 can be formed from two completely separate umbilical cords. In either case, the tailored portion 64 is preferably at least one order of magnitude less stiff than the normal portion.62 The purpose of employing an umbilical cord assembly of variable stiffness will be become clear below.

Follower assembly 50 preferably includes a multiple-axis actuator assembly made up of three actuators 52, 54 and 57 respectively. The three actuators are assembled as a single unit and mounted on a conventional support bracket 55 which is, itself, mounted to the base or frame 3. An umbilical mount 56 is attached to an arm portion 58 of the third actuator 57. Mount 56 may take the form of a hollow sleeve having fittings at either end. Alternatively, mount 56 may comprise a hollow clamp attached to arm portion 58 and having a diameter sufficient to allow normal portion 62 to pass completely through. Each of the three actuators 52, 54 and 57 is positioned to move its respective arm linearly in an orthogonal direction relative to the direction of movement of the other two actuators. As shown, actuator 52 moves its arm in the "z" direction, while actuator 54 moves its arm in the "y" direction. Actuator 57 is capable of moving its arm 58 in the "x" direction. As can be readily understood, by selectively engaging any or a combination of the three actuators, it becomes possible to move umbilical mount 56 in any of the three orthogonal directions, creating a three degree of freedom ("3-DOF") system. Each of the three actuators is of the closed-loop servomechanism type, consisting of a small gear motor and lead screw which can directly move its arm back and forth in a linear direction. Alternatively, rotary servomechanisms could be employed which translate rotary movement into linear movement of the respective arms. In a further embodiment, a number of "piezoelectric" actuators could be employed. In any case, the result is the same, the umbilical mount 56 is caused to move in any of the three orthogonal directions or a combination of directions relative to frame 3.

The normal portion 62 of umbilical cord assembly 60 is connected at one end to frame 3 and includes an opposite connected to a fitting of umbilical mount 56, The tailored portion 64 extends from a fitting on the opposite side of mount 56, not shown, into engagement with a fitting on one side of platform 1. Attached to a fitting on the opposite side of platform 1, not shown, is a hard line connector 71 which is attached at its opposite end to payload 21. The two fittings on opposite sides of platform 1 join an opening extending through platform 1, allowing fluid or vacuum to be transmitted through the tailored portion 64, through the opening in platform 1, through hard line connector 71 and into payload 21. The tailored portion 64 of umbilical assembly 60 is preferably formed with three separate loop portions 66, 68 and 70, respectively. Each of these loop portions extends perpendicular to one another within one of the three orthogonal planes x, y or z.

During operation of the vibration isolation system of the present invention, accelerometer and position sensors detect movement of the floating platform relative to the frame. The control system processes the detection signals and provides control signals to follower assembly 50, causing actuators 52, 54 and 57 to move umbilical mount 56 and attached normal umbilical portion 62 in one or more of a combination of orthogonal directions in order to oppose any movement of frame 3 and, in effect, absorb unwanted movements of frame 3 from being passed through normal umbilical portion 62 to tailored umbilical portion 64. By opposing the movements of frame 3, mount 56 and the attached end of normal portion 62 are maintained in exactly the same position relative to isolated platform 1 and payload 21. Because movement of umbilical mount 56 causes a similar movement of the attached normal portion 62 of umbilical assembly 60, any disturbing movement of frame 3 which would tend to cause motion of normal portion 62 is blocked from doing so. However, because follower actuators 52, 54 and 57 only move in axial directions, they cannot negate rotational movement of the umbilical cord assembly 60.

By forming the tailored portion 64 of umbilical cord assembly 60 with three separate loop portions along respective ones of the three orthogonal axes, each loop portion 66, 68 or 70 is capable of independently bending along its orthogonal axis to absorb torsional forces. The unique three loop design of tailored portion 64 negates the need for a six degree of freedom ("6-DOF") follower assembly in order to eliminate torsional motions not addressed by the three actuators 52, 54 and 57 of follower assembly 50. The purpose of employing a portion 64 of reduced stiffness between umbilical mount 56 and platform 1 is to further diminish the ability of the umbilical cord assembly 60 to transmit unwanted motions to platform 1 and payload 21.

Figure 7:
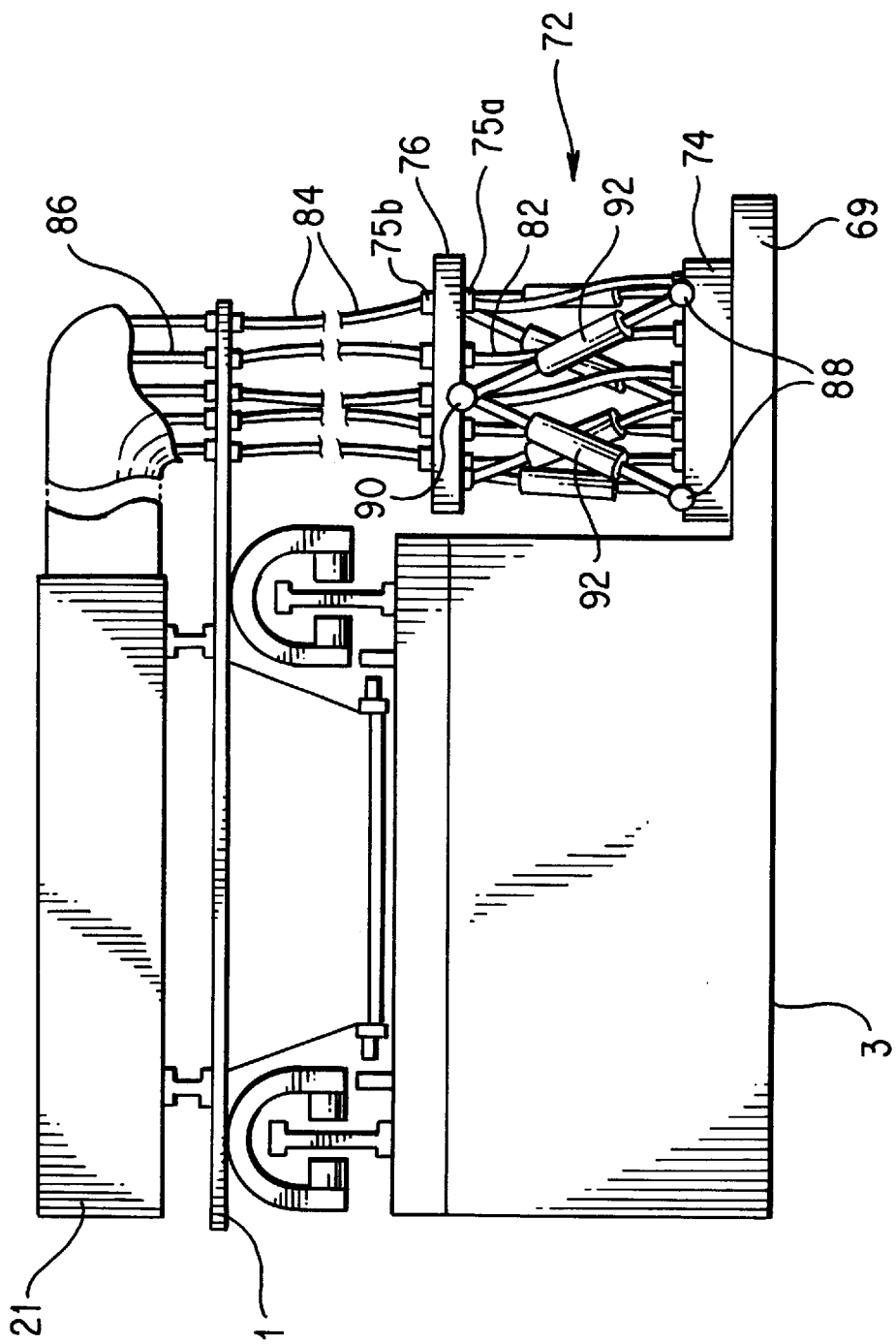
FIG. 7 is a schematic view of a six degree of freedom follower assembly and umbilical cord utilized in an alternative embodiment of the present invention.

It is considered within the scope of the present invention to replace the two separate umbilical cords 62 and 64 with a single umbilical cord having a normal portion and a tailored portion In such an arrangement, a cylindrical mounting clamp 56 could surround and frictionally engage confronting ends of umbilical portions 62 and 64. Likewise, it is possible to eliminate the three degree of freedom follower assembly 50 and umbilical cord assembly 60 altogether and replace them with a 6-DOF follower system and associated umbilical cord assembly as shown in FIG. 7. Such a system may employ an follower assembly such as a "Stewart Platform" which can provide both translational and rotational motion and is commonly utilized in aircraft simulators and other applications requiring 6-DOF positioning systems.

As illustrated in FIG. 7, frame 3 includes a mounting base portion 69. A follower assembly 72 includes a bottom member 74 resting on base portion 69. Spaced from bottom member 74 is a movable top member 76. A number of hollow connectors, not shown, extend through openings formed in top member 76, with each connector having a fitting 75a mounted on one side of top member 76 and a fitting 75b mounted on an opposite side of top member 76. An umbilical cord assembly includes a number of separate, normal umbilical members 82 each having one end attached to bottom member 74 and an opposite end attached to one of the fittings 75a. The umbilical cord assembly also includes a number of separate, tailored umbilical members 84 each having one end portion attached to one of the fittings 75b and an opposite end attached to a separate, hard line connector 86, forming an umbilical passage extending from normal member 82, through tailored umbilical member 84, hard line connector 86 and to payload 21.

Follower assembly 72 also includes multiple "point-to-center" actuator assemblies comprising six actuator pivot and attached arm members 88 mounted around the circumference of bottom member 74, two of which are shown in FIG. 7, and six actuator pivot and attached arm members 90 mounted around the circumference of top member 76, one of which is shown in FIG. 7. Pairs of pivot arms extend toward one another and into separate tubular enclosures 92. During operation, the attached arms extending toward one another function similar to an air shock absorber whereby the distance between the pairs of arms within the tubular enclosures is caused to either increase or decrease, thereby causing top member 76 to exhibit any of the six degrees of freedom including both linear and rotational movement relative to bottom member 74. The actuator pivot and attached arm members 88 and 90 along with the separate tubular enclosures 92 form a "Stewart Platform".

During operation of the embodiment of FIG. 7, the position sensors and accelerometers mounted on frame 3 and platform 1 detect relative movement and transmit appropriate position feedback information to the control system for processing. Control signals are sent to the follower assembly 72, causing movement of top member 76 relative to bottom member 74 in such a manner so as to maintain its preexisting position of top member 76 relative to platform 1 and payload 21. Follower assembly 72 effectively counteracts any motion of the normal umbilical cord members which would otherwise disturb the position of platform 1 and payload 21. Because the position of the follower top member 76 does not move relative to payload 21, there is no net component of motion acting on the tailored umbilical cord members 84 in any rotational direction. Nevertheless, it is preferred that each of the tailored umbilical cord members 84 include the three separate loop portions shown in the embodiment of FIG. 3 in order to completely absorb or significantly dampen any torsional forces not already eliminated by follower assembly 72.

Rather than employing a number of separate pairs of normal and tailored umbilical cord members 82 and 84, respectively, in the 6-DOF embodiment shown in FIG. 7, one or a plurality of continuous umbilical cord members having portions of varying stiffness may be employed. In such an alternative embodiment, each umbilical passes through an opening in top member 76 while frictionally engaging the side walls of an opening through platform 1 to assure that the umbilical cord undergoes precisely the same motion as top member 76.

Based on the above and foregoing, it can now be appreciated that the follower assembly and umbilical cord assembly of the present invention have distinct advantages for existing vibration isolation systems, including, but not limited to those enumerated below:

1. The follower assembly allows for the use of stiffer umbilical cords capable of transmitting coolant and other fluids to the payload while at the same time preventing the umbilical from transmitting unwanted motions to the payload.
2. The follower assembly minimizes forces generated by relative motion of the ends of the umbilical cord.
3. The unique low stiffness of the umbilical tailored portion eliminates the problems due to torsional rigidity of the umbilical cord.
4. The follower assembly can be used to minimize power consumption of the non-contacting actuators since it can eliminate both bias and preload forces from affecting the non-contacting actuators as well as reduce necessary actuator gap.
5. The follower assembly can be designed to have non-reversible actuators so that in case of electronic failure, the follower would stay in its last fixed position, reverting to a fixed-base isolation system where one end of the umbilical is grounded as in the copending application.

Although various embodiments of the present invention have been described in detail hereinabove, it should be clearly understood that many variations and/or modifications of the basic inventive concepts herein taught which appear to those skilled in the pertinent art will still fall within the spirit and scope of the present invention as defined in the appended claims.

What is claimed is:

1. A multi-directional umbilical and follower assembly for preventing unwanted movements of a frame from being transmitted through an umbilical assembly to a microgravity floating platform and payload mounted on the platform, comprising:

an umbilical mount attached to a portion of the umbilical assembly, wherein the umbilical assembly is made up of at least two portions, for moving the umbilical assembly relative to the frame;

actuator means for providing the umbilical mount with at least three degrees of freedom of movement in three orthogonal directions; and control means for directing the actuator means to move the umbilical mount and attached umbilical assembly opposite to unwanted movements of the frame to maintain the umbilical mount in a predetermined position relative to the platform and thereby prevent the umbilical assembly from transmitting unwanted movements of the frame to the platform and payload.

2. The umbilical and follower assembly as set forth in claim 1, wherein the actuator means comprises an actuator assembly including three separate, linear actuators and an attached arm member movable in three orthogonal directions when one or more of the actuators is engaged.

3. The umbilical and follower assembly as set forth in claim 2, wherein the umbilical mount includes a hollow connector having separate fittings on opposite ends, with the hollow connector mounted on the attached arm of the actuator assembly for joint movement therewith.

4. The umbilical and follower assembly as set forth in claim 2, wherein the umbilical mount includes a cylindrical clamp mounted on the attached arm of the actuator assembly for joint movement therewith.

5. The umbilical and follower assembly as set forth in claim 3, wherein the umbilical assembly includes a first umbilical member having one end attached to the frame and having an opposite end attached to one of the fittings mounted on the hollow connector;

the umbilical assembly further includes a second umbilical member having one end attached to the fittings mounted on the opposite side of the hollow connector and having an opposite end in fluid communication with the payload; whereby the first and second umbilical members having sufficient stiffness for transmitting fluid, vacuum or power from the frame, through the first and second umbilical members and to the payload.

6. The umbilical and follower assembly as set forth in claim 5, wherein the first umbilical member is formed with a normal stiffness sufficient for transferring coolant, vacuum or power; and, the second umbilical member is formed with a reduced stiffness at least one order of magnitude less than the than the stiffness of the first umbilical member.

7. The umbilical and follower assembly as set forth in claim 6, wherein the second umbilical member includes three separate loop portions, with each loop portion extending within a respective one of three different orthogonal planes and capable of deforming to minimize unwanted torsional motions from being transmitted by the umbilical assembly to the floating platform and payload mounted on the platform.

8. The umbilical and follower assembly as set forth in claim 4, wherein the umbilical assembly comprises a single umbilical cord member having a first portion attached at one end to the frame and a second portion connected to the first portion and also in fluid connection with the platform; and, the single umbilical cord member passes through and makes frictional contact with the cylindrical clamp, assuring joint movement of the clamp and the single umbilical cord member.

9. The umbilical and follower assembly as set forth in claim 8, wherein the first portion of the umbilical cord member is formed with a normal stiffness sufficient for transferring coolant, vacuum or power; and, the second portion of the umbilical cord member is formed with a reduced stiffness at least one order of magnitude less than the stiffness of the first portion.

10. The umbilical and follower assembly as set forth in claim 8, wherein the second portion includes three separate loop portions, with each loop portion extending within a respective one of three different orthogonal planes and capable of deforming to minimize unwanted torsional motions from being transmitted by the umbilical assembly to the floating platform and payload mounted on the platform.

11. The umbilical and follower assembly as set forth in claim 1, wherein the actuator means comprises an actuator assembly including a bottom attached to the frame and a top member spaced from frame and also spaced from the platform, the actuator assembly further including six actuator pivot members mounted on the bottom member and six actuator pivot members mounted on the top member with each pivot member including arm members extending toward opposite pivot members, with tubular enclosures surrounding confronting arm members for selectively moving the top member in six degree of freedom movement along three orthogonal axes relative to the bottom member.

12. The umbilical and follower assembly as set forth in claim 11, wherein the umbilical mount comprises separate fittings mounted on opposite sides of the top member and a passageway extending through the top member between the fittings.

13. The umbilical and follower assembly as set forth in claim 12, wherein the umbilical assembly includes a first umbilical member of normal stiffness extending between the frame and the fitting mounted on a side of the top member facing the first umbilical member.

14. The umbilical and follower assembly as set forth in claim 13, wherein the umbilical assembly further includes a second umbilical member having a reduced stiffness of at least one order of magnitude less than the stiffness of the first umbilical member, the second umbilical member having one end attached to the fitting mounted on the opposite side of the top member and having an opposite end in fluid communication with the payload, whereby the first and second umbilical members are of sufficient stiffness for transmitting fluid, vacuum or power from the frame, through the first and second umbilical members and to the payload.

15. The umbilical and follower assembly as set forth in claim 14, wherein the second umbilical member includes three separate loop portions, with each loop portion extending within a respective one of the three different orthogonal planes and capable of deforming to minimize unwanted torsional motions from being transmitted by the umbilical assembly to the floating platform and payload mounted on the platform.

16. The umbilical and follower assembly as set forth in claim 1, wherein the umbilical assembly comprises a plurality of separate umbilical members each extending between the frame and the platform, with each umbilical member attached to an umbilical mount for joint movement therewith.

17. A multi-directional umbilical and follower assembly for preventing unwanted movements of a frame from being transmitted through an umbilical assembly to a microgravity floating platform and payload mounted on the platform, comprising:

an umbilical mount engaging a portion of the umbilical assembly, wherein the umbilical assembly is made up of at least two portions, for joint movement;

the follower assembly including three separate actuators mounted on the frame and having an arm attached to an umbilical mount for joint movement therewith in three orthogonal directions; and control means for directing the three actuators to move the umbilical mount and attached umbilical assembly opposite to unwanted movements of the frame, thereby maintaining the umbilical mount and attached umbilical assembly in a predetermined position relative to the platform, while preventing the umbilical assembly from transmitting unwanted frame movements to the platform and payload.

18. The umbilical and follower assembly as set forth in claim 17, wherein the umbilical assembly has one end attached to the frame and an opposite end in fluid communication with the payload.

19. A multi-directional umbilical and follower assembly for preventing unwanted movements of a frame from being transmitted through an umbilical assembly to a microgravity floating platform and payload mounted on the platform, comprising:

the follower assembly including a bottom member mounted on the frame and a top member having at least one through passageway and spaced from both the bottom member and the platform, and further including an actuator assembly having a plurality of six actuator pivot members mounted on both the top and bottom members with attached arms extending from the pivot members on the top and bottom members toward one another and into engagement with tubular enclosures arranged between the top and bottom members;

the umbilical assembly including at least one first umbilical member extending from the bottom member to a fitting mounted at the end of the passageway through the top member, and further including at least one second umbilical member extending from a fitting on an opposite end of the passageway through the top member into fluid communication with the payload; and control means for directing the actuator assembly to move the top member and attached umbilical assembly in any of three linear and/or three rotational directions opposite to the unwanted movements of the frame, thereby maintaining the top member and connected portion of the umbilical assembly in a predetermined position relative to the platform to prevent the umbilical assembly from transmitting the unwanted frame movements to the platform and payload.

\* \* \* \* \*